March 7, 1944. H. B. FUGE ET AL 2,343,546

BRUSH ASSEMBLY FOR DYNAMOELECTRIC MACHINES

Filed March 31, 1942

Inventor
Harry B. Fuge
and Leonard C. Pratt
By John F. Heine
Attorney

Witness:
Godfrey Pecina

Patented Mar. 7, 1944

2,343,546

UNITED STATES PATENT OFFICE 2,343,546

BRUSH ASSEMBLY FOR DYNAMOELECTRIC MACHINES

Harry B. Fuge, Elizabeth, N. J., and Leonard C. Pratt, Baldwin, N. Y., assignors to The Singer Manufacturing Company, Elizabeth, N. J., a corporation of New Jersey Application March 31, 1942, Serial No. 436,992

10 Claims. (Cl. 171—323)

This invention relates to a brush assembly for conducting electric current to and from a continuously rotating member.

The construction accordingly to our invention has considerable utility especially in connection with low torque dynamo electric devices of small dimensions of the type usually employed as transmitters and/or receivers in the systems referred to as synchro-tie or self synchronous systems. Such systems are commonly used for the transmission of marine and aircraft navigational data and gun fire control data between relatively remote points. In such systems, difficulty is experienced in maintaining precise angular coincidence between the transmitter and the receiver. One of the primary causes of this inaccuracy is the resisting torque provided by the frictional forces between rotor and stator which exist at the bearing and brush-contact surfaces of the receiver unit. This frictional resistance becomes particularly adverse in the case of the so-called "miniature" units where the torque available to turn the rotor into coincidence against the frictional forces is small. The bearing friction is minimized in such units by employing precision ball bearings. If ordinary brush structure and slip rings are used, the frictional forces involved are considerable relative to the torque capacity of the unit. Attempts to reduce this friction by merely lowering the brush pressure result not only in poor conduction but also in an unstable condition in which the brushes may be easily jarred out of contact with the surface of the slip ring, thus producing erratic operation and false indication.

It is, therefore, an object of this invention to provide a sure and proper electrical connection of low contact resistance and low resisting torque between a stationary and a continuously rotating member.

In "miniature" units, of small dimensions, some of which have a rotor diameter of less than one-half of an inch, the space available for slip rings, brushes and brush-holders is very small. A unit of this kind is shown and described in the application Serial No. 432,384, of William H. Brady, filed Feb. 26, 1942. The slip rings of this particular unit have a diameter of approximately one-quarter of an inch and a face width of about one-sixteenth of an inch. It is clear from these dimensions that a very slight axial displacement of the brushes is sufficient to cause them to run off the slip rings and break contact therewith. While the requirement for small dimensions dictates a small axial spacing between them, the brushes must be placed apart sufficiently to provide adequate electrical insulation between them.

It is a further object of this invention, therefore, to provide a brush and brush-holder assembly which has a minimum axial spacing consistent with adequate electrical insulation and at the same time has suitable axial stiffness and means to insure that the brushes will remain spaced apart to maintain proper alignment relative to the slip rings.

The importance of providing these dynamo electric units with means for readily inspecting the rotor has been pointed out in the application referred to above. This requires the brushes to be so arranged that they may be easily drawn out of contact with the slip rings in order that the rotor may be axially withdrawn from the stator for inspection. It is also essential that said brushes be replaceable in proper alignment with the slip rings by a simple external manipulation.

It is, therefore, another object of this invention to provide a unitary brush structure which carries the brushes in fixed predetermined spaced apart relation on a supporting block of insulating material which fits removably within a complemental recess in the casing of the dynamo electric machine not only to properly position and secure the brushes in aligned engagement with the slip rings but also to serve as a terminal block for connecting the external leads to the rotor and as a closure for the casing.

With the above and other objects in view, as will hereinafter appear, the invention comprises the arrangement of parts hereinafter set forth and illustrated in the accompanying drawing of certain specific embodiments of the invention, from which the several features of the invention and the advantages attained thereby will be readily understood by those skilled in the art.

Figures 1, 2:
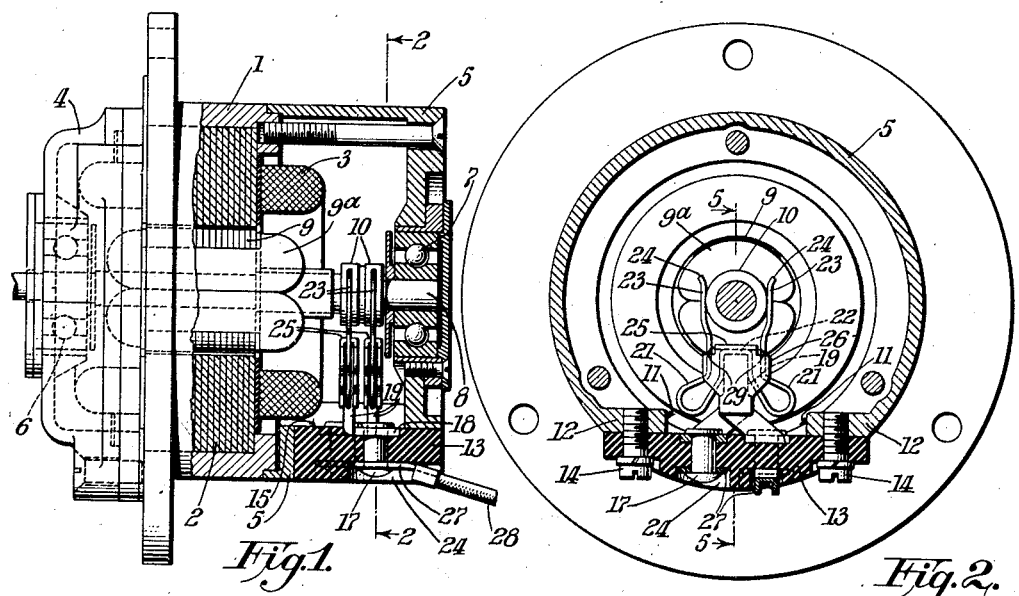
Fig. 1 is a longitudinal sectional view, partially in elevation, through a dynamo electric machine embodying the invention.
Fig. 2 is a vertical section on line 2—2, Fig. 1.

Referring more specifically to Fig. 1, there is shown a dynamo electric machine comprising a frame member 1, a laminated stator core member 2 secured within said frame member and provided with a winding 3. End bonnets 4 and 5 are secured to said frame member and carry bearings 6 and 7 respectively in which is journaled a shaft 8 carrying a rotor core 9 and winding 9ª. Current-collecting slip rings 10 are secured in insulated spaced apart relation on the rotor shaft 8 and are electrically connected to the ends of winding 9ª. For a more complete description of this dynamo electric machine construction reference is had to the application Serial No. 432,384 hereinbefore mentioned.

The end-bonnet 5 is formed with a side apertured portion 11 having thickened inturned wall portions 12 defining the edges of said apertured portion and forming a seat for a supporting block 13 removably secured to said end-bonnet 5 by means of screws 14 threaded into said wall portions 12. The supporting block 13, preferably made from molded insulating material, is formed on the exterior with a generally cylindrical surface, which conforms to the peripheral contour of the end-bonnet 5, except where flat portions are provided for seating the screws 14 and the rivets 17. Within the end-bonnet 5, the block 13 presents a flat supporting platform surface 15 located in a plane normal to a radial plane through the center of the apertured portion 11.

Figures 3, 4, 5:
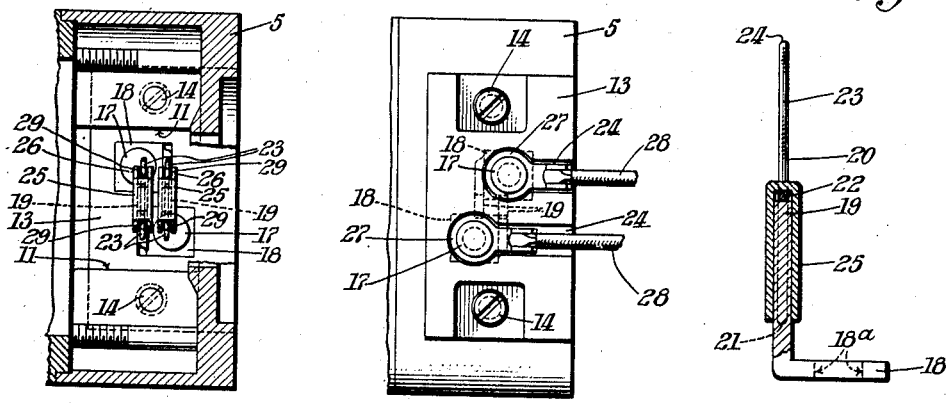
Fig. 3 is a top plan view partially in section, showing the improved brush assembly at one end of the dynamo electric machine with the rotor assembly completely removed.
Fig. 4 is a bottom plan view of the brush assembly showing external lead connections.
Fig. 5 is an enlarged detailed vertical sectional view, partially in elevation, taken on line 5—5, Fig. 2, through a single improved brush and brush holder.
Figure 6:
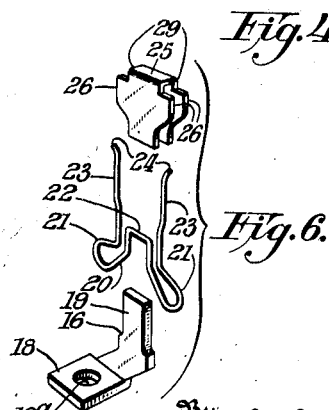
Fig. 6 is a disassembled perspective view of a single improved brush and brush holder.

Post members 16 formed from flat stock having sufficient electrical conductivity are secured to the supporting block 13 by any suitable means such as rivets 17, as clearly shown in Fig. 2. These post members 16 are formed at one end with flat rectangular base portions 18 containing apertures 18ª for receiving the rivets 17. A vertical stem portion 19 of the post member 16 stands in a plane normal to the plane of the base portion 18 and has its central axis offset relative to the center of the base portion, as most clearly seen in Fig. 6. A single light spring wire of corrosion-resistant material and having a circular cross section is formed into a generally U-shaped brush element 20 having depending open side loops 21 providing a reentrant portion 22 which is adapted to fit closely over the free end of the stem portion 19 of the post member 16 as shown best in Fig. 2. The brush element 20 is also provided with two parallel spaced apart limbs 23 which terminate at their free ends in outwardly-turned portions 24. An inverted U-shaped cap member 25 made from flat stock is formed with extended lateral ear portions 26 and is adapted to straddle the free end of the stem portion 19 and to confine the reentrant portion 22 of the brush 20 between the cap member and the free end of the stem portion 19 as seen best in Figs. 2 and 5. The ear portions 26 extend sufficiently over the edges of the post member 16 to overlie a portion of the spaced apart limbs 23 and loops 21 and to provide guide slots therefor to limit the axial displacement of the brush member 20 and to prevent it from riding off the slip ring 10.

The portion 22 of the brush member 20 as well as the cap member 25 are secured to the stem portion 19 by soldering, brazing or any other suitable means of fastening. The loops 21 provide considerable resiliency for the limbs 23 in directions transverse to the rotor axis. This resiliency coupled with the lightness of weight is of considerable importance in providing a brush structure which is capable of responding readily to changes in the contour of the slip rings so that the limbs 23 will always remain in intimate electrical contact with the surfaces of rings 10 even though said surfaces may become irregular due to nonuniform wear. Because it has but very small inertia, the entire brush structure is not subject to displacement from external vibration and shock. Further, the double contact feature provided by the spaced apart limbs which embrace the slip rings and make electrical contact therewith at two diametrically opposite points, as shown in Fig. 2, greatly increases the probability that contact between brush and slip rings will be maintained in spite of severe relative transverse displacement. In this regard, it is to be noted that most transverse displacements which tend to take one limb of the brush member out of contact with the slip rings also tend to force the diametrically opposite limb into more intimate contact with that slip ring thus preserving an electrical connection between said brush member and slip ring. These factors are of special importance where the dynamo electric machine is required to give very reliable service in applications on aircraft, marine and land vehicles where they may be subject to random external disturbing forces.

The cylindrical wire limbs 23 cross the cylindrical slip rings 10 substantially at right angles and therefore provide a contact of very small area with the result that the surface frictional forces involved are small. Further, due to the opposed relation of the limbs 23 the pressures applied to the slip rings by the limbs of the brushes are equalized within the rings themselves and are not transmitted to the bearings to add to the bearing load.

The insulating supporting block 13 has depressed slot portions 24 disposed axially in the outer surface for receiving the terminal lugs 27 and external leads 28. The rivets 17 extend through said block and secure the post members 16 on the inside and the terminal lugs 27 on the outside to said block and at the same time provide an electrical conducting connection between said post members and said lugs. The base portion 18 of the post member 16 is made sufficiently large to provide an adequate bearing surface against the block 13 to give rigidity to the post members 16 and prevent contact between brushes 20 as well as maintain said brushes in proper alignment with the slip rings 10. It is preferable to seat said base portions 18 within complemental depressed portions of block 13, as shown in Fig. 2, to prevent the post members 16 from turning and thus carrying the brush members out of alignment with the slip rings. In order to minimize the axial space required by the brushes, the base portions 18 are arranged in the spaced apart axially overlapping position shown in Fig. 3.

It is to be understood that the insulating block 13, including the post, brush and cap members on one side and the terminal lugs on the other side thereof, comprise a unitary brush structure which is removable from the end-bonnet by merely withdrawing the screws 14 and pulling the block 13 radially away from the end-bonnet to disengage the brushes 20 from the slip rings 10. The unsprung distance between the opposed limbs 23 is made less than the diameter of the slip rings 10 so that the limbs must be sprung apart to engage the slip-rings in contacting relation thus providing a positive radial pressure for holding said limbs against said slip rings. Edge portions 29 of cap member 25 provide stops against which bear the limbs 23 to limit their minimum spaced-apart distance. The outwardly-turned portions 24 facilitate the reassembly of the brush structure into the end-bonnet by providing a guide for properly directing the slip rings between the limbs 23. This is especially important in this case where the brush assembly includes a closure member which when in place renders the brushes inaccessible for any subsequent adjustment relative to the slip rings.

From the foregoing it will be perceived that we have provided an improved and simplified unitary brush assembly for rotating electrical apparatus which combines light weight and rigid construction to provide an electrical connection between stator and rotor elements having adequate conductance and requiring a minimum resisting torque, including stator means for maintaining said electrical connection closed at all times even under conditions of severe external vibration and shock.

It will be obvious to those skilled in the art that the invention may, without departure from its essential attributes, be embodied in various specific forms other than those shown and described, which latter are to be considered in all respects as illustrative of the invention and not restrictive, reference being had to the appended claims rather than to the foregoing description to indicate the scope of the invention.

Having thus set forth the nature of the invention, what we claim herein is:

1. A unitary brush assembly for rotating electrical apparatus, comprising a block of insulating material, current-conducting posts secured at one end thereto in fixed spaced-apart relation, spring wires formed into generally U-shaped brush elements having saddle-like mid-portions which straddle and are secured to the free ends of said post members and having depending side loop portions which terminate in parallel, opposed limb portions of cylindrical form.

2. A unitary brush assembly for rotating electrical apparatus, comprising a block of insulating material, current-conducting posts secured thereto in fixed spaced-apart relation, spring wires formed into generally U-shaped brush elements secured at their mid-portions to the free ends of said posts, and inverted U-shaped cap members secured over said free ends to retain said brush elements in proper position on said posts.

3. A unitary brush assembly for rotating electrical apparatus, comprising a block of insulating material, current-conducting posts secured thereto in fixed spaced-apart relation, cylindrical spring wires formed into generally U-shaped brush elements secured at their mid-portions to the free ends of said posts, inverted U-shaped cap members secured over said free ends and formed with extended ear portions which provide guideways whereby said brush elements are constrained to move in planes substantially at right angles to the axis of rotation.

4. A unitary brush assembly for electrical apparatus having a rotor provided with cylindrical conducting surfaces, comprising a block of insulating material, current-conducting posts secured thereto in fixed spaced-apart relation, spring wires formed into generally U-shaped brush elements secured at their mid-portions to the free ends of said posts and having parallel spaced apart limb portions which resiliently embrace said conducting surfaces, U-shaped cap members inverted over said free ends, secured to said posts and formed with ear portions which overlie the edges of said posts to provide guideways therefor whereby said brush elements are constrained to move in planes substantially at right angles to the axis of said rotor.

5. In a dynamo electric machine having a casing, an aperture in said casing, and a rotor which carries cylindrical current-collecting means, a unitary brush assembly comprising a block of insulating material forming a base removably secured to said casing to cover said aperture, current-conducting post members secured to said base, U-shaped, cylindrical, spring wire brush members secured to said post members and having extended, parallel, spaced-apart limbs which are positioned in resilient surface-to-surface contact with said cylindrical current-collecting means and guide means secured to said post members for confining the displacement of said brush members in planes substantially transverse to the axis of said rotor.

6. In a dynamo electric machine having a casing, an aperture in said casing, and a rotor which carries coaxial cylindrical current-conducting means, a unitary brush assembly comprising a block of insulating material forming a base removably secured to said casing to cover said aperture, current-conducting post members secured to said base, U-shaped, spring wire brush members secured to said post members and having extended, parallel, spaced-apart, cylindrical limbs positioned with their axes substantially at right angles to the axis of said cylindrical current-conducting means, and guide means secured to said post members for confining the displacement of said brush members in planes substantially transverse to the axis of said rotor.

7. In a dynamo electric machine having a casing, an aperture in said casing, and a rotor which carries current-conducting means having cylindrical surfaces, a unitary brush assembly comprising a block of insulating material forming a base removably secured to said casing to cover said aperture, current-conducting post members secured at one end to said base, U-shaped, cylindrical, spring wire brush members secured to the free ends of said post members and having open side loops terminating in extended, parallel, spaced-apart limbs which resiliently embrace said current-conducting means at diametrically opposite points on said cylindrical surfaces, and guide means secured to said post members for confining the displacement of said brush members in planes substantially transverse to the axis of said rotor.

8. A brush assembly for a rotating dynamo electric machine having slip rings, comprising, in combination, a block structure having a flat platform portion, rigid current-conducting post members secured at one end to said block structure and extending in a direction substantially at right angles to and away from said platform portion, U-shaped spring wire brush members supported from the free ends of said post members and having parallel opposed limb portions of cylindrical form which resiliently embrace the respective slip rings, and guide means secured to said post members and positioned to retain the brush members on the post members and to confine the displacement of said limb portions substantially in the planes of said respective slip rings.

9. A brush assembly for a rotating dynamo electric machine having cylindrical slip rings, comprising, in combination, a block structure of insulating material having a flat platform portion, rigid current-conducting post members secured at one end to said block structure within complemental recesses therein and extending in a direction substantially at right angles to and away from said platform portion, U-shaped spring wire brush members supported from the free ends of said post members and having resilient, parallel opposed limb portions of cylindrical form which have an unsprung spaced-apart distance less than the diameter of said cylindrical slip rings and which embrace the respective slip rings, and guide means secured to said post members and positioned to retain the brush members on the post members and to confine the displacement of said limb portions substantially in the planes of said respective slip rings.

10. A brush assembly for a rotating dynamo electric machine having slip rings, comprising, in combination, a block structure having a flat platform portion, rigid current-conducting post members secured at one end to said block structure and extending in a direction substantially at right angles to and away from said platform portion, U-shaped spring wire brush members having saddle-like mid-portions which straddle and are secured to the free ends of said post members and having depending side loop portions which terminate in parallel, opposed limb portions of cylindrical form which resiliently embrace the respective slip rings in surface-to-surface contact at diametrically opposite points, and guide means secured to said post members and positioned to retain the brush members in proper position on the post members and to confine the displacement of said limb portions substantially in the planes of said respective slip rings.

HARRY B. FUGE.
LEONARD C. PRATT.